Nov. 22, 1949     G. T. BAKER     2,488,797
ELECTRICALLY OPERATED TIMING ARRANGEMENT
Filed May 27, 1946     9 Sheets-Sheet 3

INVENTOR
GEORGE THOMAS BAKER
BY
ATTORNEY

Nov. 22, 1949  G. T. BAKER  2,488,797
ELECTRICALLY OPERATED TIMING ARRANGEMENT
Filed May 27, 1946  9 Sheets-Sheet 4

Fig. 4

INVENTOR
GEORGE THOMAS BAKER
BY
ATTORNEY

INVENTOR
GEORGE THOMAS BAKER

Fig. 13

Patented Nov. 22, 1949

2,488,797

UNITED STATES PATENT OFFICE 2,488,797

ELECTRICALLY OPERATED TIMING ARRANGEMENT

George Thomas Baker, Liverpool, England, assignor to Automatic Electric Laboratories, Inc., Chicago, Ill., a corporation of Delaware Application May 27, 1946, Serial No. 672,387
In Great Britain June 13, 1945

12 Claims. (Cl. 179—7.1)

The present invention relates to electrically-operated timing arrangements and is more particularly concerned with arrangements suitable for use in telephone systems. The need for such equipment generally arises in large metropolitan systems where it is used for timing the duration of calls and if necessary controlling multi-metering and it may also be used for timing the duration of long distance calls. It has been found by most telephone administrations that for calls involving more than a certain predetermined fee it is necessary in the interest of sound economics that the charge should be repeated for each period of, conveniently, three minutes and consequently equipment has to be provided to effect suitable timing. It is essential that some portion of this equipment should be associated with each connection concerned and if the equipment is of a complicated nature, it adds appreciably to the cost of providing service. Indeed an outstanding disadvantage of existing arrangements is that they are so expensive and complicated that, in many cases, for comparatively short distance calls it is more economical to allow the subscriber unlimited time for a single fee. The chief object of the present invention is to produce a simplified and cheapened arrangement whereby timing of the kind referred to may be readily effected and moreover the equipment is suitable for use in quite small exchanges where it is not usually economically practicable to provide a clock of high accuracy to give the necessary time pulses.

According to one feature of the invention, in an electrical timing arrangement suitable for use in a telephone system for measuring the duration of a call, impulses applied at predetermined intervals to a group of relays serve to effect their operation in successive characteristic combinations to indicate different values of elapsed time.

According to another feature of the invention, in an electrical timing arrangement employing a rotary stepping switch driven so as to describe a complete revolution in a predetermined time, the wipers of the switch in passing over any particular position are arranged to connect with a group of relays which are adapted to be operated in characteristic combinations to register different values of a numerical digit the setting of the relays being then transferred to a group of common relays which thereupon control the setting of the relays to register the next higher value of the digit.

A further feature of the invention is that in an electrical timing arrangement suitable for use in a telephone system for measuring the duration of a call, a rotary stepping switch is arranged in passing over any particular position to influence a group of relays to cause them to be operated in successive different combinations, the influencing of the relay groups encountered in a subsequent position being prevented until the relay group encountered in the previous position has been operated to a predetermined combination.

Preferably use is made of a group of relays comprising four units of miniature type which are mounted on a common support and each of which carries a single pair of make springs. The constructional details of a suitable multiple relay of this type are disclosed in my co-pending United States application Serial No. 664,782, filed April 25, 1946.

The invention will be better understood from the following description of various methods of carrying it into effect which should be taken in conjunction with the accompanying drawings comprising Figs. 1–13. Figs. 1–7 illustrate somewhat schematically the principles on which the invention works rather than a complete scheme for a specific purpose; such a scheme is however shown in Figs. 12 and 13. Figs. 1, 2 and 3 when placed together in the manner shown in Fig. 8 show the equipment connected up so as to count up to 100 minutes in steps of six seconds.

Figure 1:
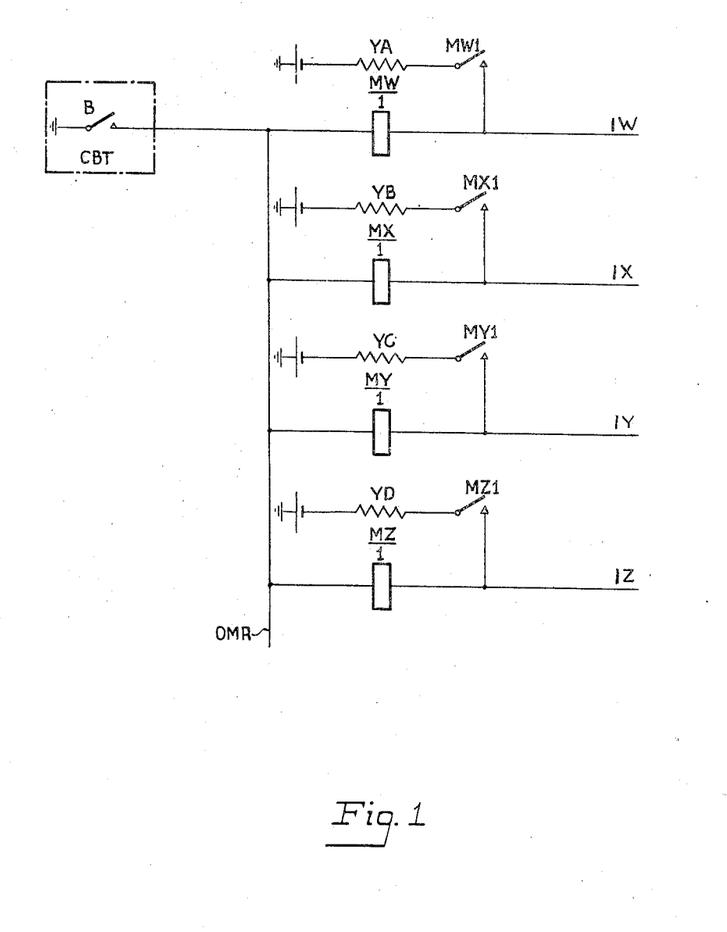
Fig. 1 is intended to show the general scheme of connections of the multiple relays.

Referring now to Fig. 1, each digit is dealt with by a multiple group of four relays MW, MX, MY and MZ, which as previously mentioned are preferably of small size and mounted on a common support so as to occupy only the space of an ordinary telephone relay. When the equipment may be required to become effective, an operating and holding earth is connected up by the B relay contact shown in the dotted rectangle CBT representing a portion of the individual equipment and this earth by its extension over lead OMR may serve for other multiple relay groups associated with the same individual circuit. The control of the relays MW, MX, MY and MZ is effected respectively over the leads IW, IX, IY, IZ by the connection of either battery or earth thereto. For instance, if battery is connected to lead IW after the equipment has been conditioned for use by the operation of individual relay B, relay MW will be energised and at contacts MWI will complete a locking circuit for itself in series with resistor YA. Consequently when the operating battery is removed, relay MW will remain energised and moreover its condition will be indicated by the presence of battery potential on lead IW. If battery is subsequently connected to lead IW, no change will be produced but if earth is connected thereto, relay MW will be shunted down. Similar remarks apply to the other units of the group MX, MY and MZ.

Figure 2:
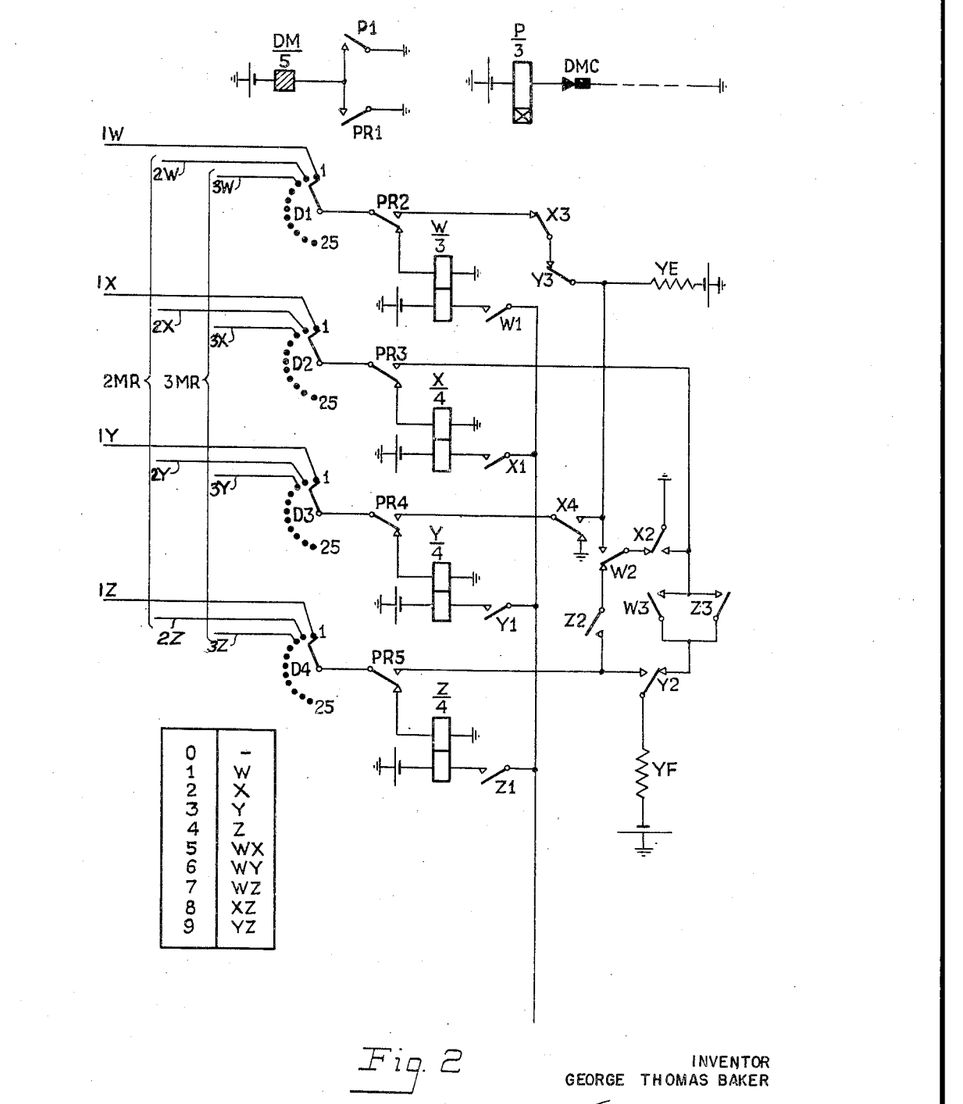

Referring now to Fig. 2, which shows the common equipment, this comprises essentially a uniselector D of the reverse drive type which is arranged to step at constant speed under the control of any suitable driving arrangements. For the purpose of illustration in this figure it is assumed that the stepping is effected by interaction between the driving magnet DM and relay P which is slightly slow to operate and is arranged to be connected to earth by suitable control contacts when it is desired to start the equipment. It is assumed, moreover, that the stepping speed is such that the uniselector makes one revolution in six seconds, that is to say in a tenth of a minute, and the wiring shown is such as to give counting up to 100 minutes. In this case each individual circuit to which the timing is applied will require three contacts in the bank of the uniselector so that eight individual circuits may be dealt with by a 25-point uniselector of standard type. The common equipment also includes relays W, X, Y and Z which are of the ordinary type and to which the existing setting of the multiple relay groups is transferred in turn and these relays then cause the multiple relay groups to be re-set to register an additional unit. At the next change after each multiple relay group registers 9, one unit is also added to the multiple relay group representing the digit of next higher denomination. These changes only take place however in respect of circuits for which timing is required and though the wipers passing over contacts associated with circuits in a quiescent state may pick up potential which will operate the common relays W, X, Y and Z, this is without any effect on the multiple relays owing to the non-operation of relay PR.

Figures 3, 8, 9, 10, 11:
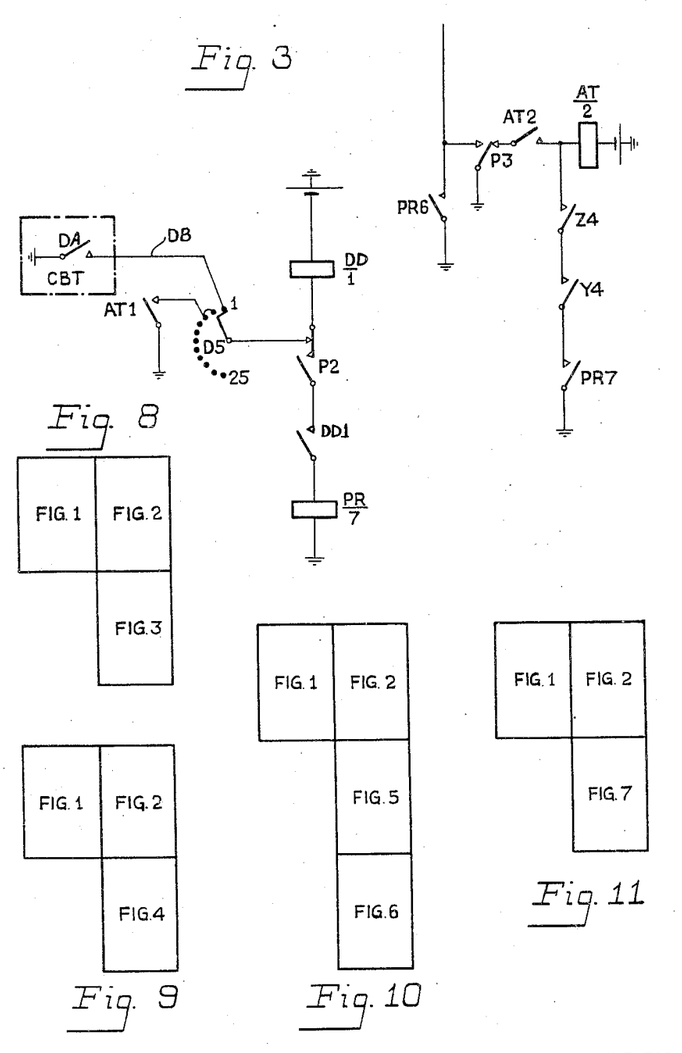

The timing operation for any particular circuit, for instance that shown in Fig. 1, commences on the connection of earth to lead DB, Fig. 3, by relay DA in the dotted rectangle CBT representing the individual equipment which may be assumed to be operated when the wanted party replies. Assuming that the switch is already in opertion, when wiper D5 next moves into position 1 so as to encounter the lead which is thus earthed, relay DD is operated and on the subsequent operation of relay P which will take place immediately thereafter owing to the closing of the interrupter contacts DMC as the wipers advance, relay PR is operated over contacts P2 in series with relay DD. When the wipers first engage the contacts in position 1, however, the setting of the associated multiple relay group which is at this time zero is transferred to the upper windings of relays W, X, Y and Z and in the circumstances assumed none of these relays is operated. Consequently when relay PR operates, battery by way of resistor YE is extended over contacts Y3, X3 and PR2 to operate the relay MW, Fig. 1. Earth is also connected to wiper D3 but without effect and no potential is connected to wipers D2 and D4. Accordingly the effect is to register the digit 1 as will be apparent from consideration of the table showing the digit code employed which is included in the lower portion of Fig. 2. When relay P de-energises on the opening of contacts DMC by magnet DM, relays DD and PR are also released and on the release of the latter relay the switch advances a further step owing to the opening of contacts PRI. No circuit will be completed for relay DD in position 2 or in position 3 so that relay PR is not operated but the stepping of the uniselector wipers continues by the interaction of magnet DM and relay P. In position 4 the wipers will encounter the contacts associated with another circuit and if timing is required for this circuit, the associated DB lead will be earthed and similar operations will take place.

As regards the circuit shown in Fig. 1, however, no further changes occur until the wipers have made a complete revolution and again reach position 1 six seconds later. Battery provided by relay MW now serves to operate relay W over its upper winding and unless the connection has been released relay DD is again operated so that the energisation of relay PR follows the operation of relay P. Contacts P3 and PR3 now serve to hold relay W over its lower winding and contacts WI, while earth over contacts X2, W2, Y3, X3 and PR2 serves to shunt down relay MW, Fig. 1. Moreover battery by way of resistor YF, contacts Y2, W3 and PR3 now causes the operation of relay MX so that the setting of the multiple relay group is changed to relay MX alone operated corresponding to the digit 2. Again contacts 2 and 3 are passed over without any effect being produced and on the succeeding revolution relay MX is shunted down over contacts X2 and PR3 while relay MY is operated from battery by way of resistor YE and contacts X4 and PR4. The operation continues in this manner and it may readily be confirmed that the various relays of the multiple relay group MW—MZ are operated in turn in the manner indicated in the table.

On the next revolution of the uniselector after relays MY and MZ have been operated representing the digit 9, these relays produce operation of relays Y and Z, Fig. 2, and relay MY is then shunted down over contacts X4 and PR4 while relay MZ is shunted down over contacts X2, W2, Z2 and PR5. Moreover, contacts Y3 prevent the connection of battery to wiper DI and contacts Y2 prevent the connection of battery to wiper D2 so that the net result is that all the units of the multiple relay group are de-energised corresponding to registration of the digit 0. Furthermore, on the operation of relay PR, relay AT, Fig. 3, is operated over contacts PR7, Y4 and Z4 and thereupon at contacts ATI earths contacts 2 and 3 in the bank of wiper D5 and at contacts AT2 prepares a locking circuit for itself. Consequently, when the wipers step to position 2, relay AT remains energised over contacts P3 and hence relay DD is held. Since relay PR can now operate one is added in the usual way to the registration of the minutes multiple relay group connected to position 2 of the switch and associated with the bracketed leads 2MR. Relay AT deenergises when the wipers step to position 3 and it is only after 9.9 minutes have been registered, when the wipers are in position 2, and relays Y and Z are again energised, that relay AT can be maintained operated in position 3. In these circumstances one is added to the registration on the tens of minutes multiple relay group connected to this position and associated with the bracketed leads 3MR.

It will be appreciated that the process described is repeated as long as timing is required and when the circuit is eventually released, earth is removed by relay B, Fig. 1, to release such of the relays MW—MZ and similar ones in the other two groups as are operated. Furthermore the removal of earth from lead DB, Fig. 3, prevents this particular circuit being associated with the common equipment on subsequent cycles of the uniselector. It will be understood that before the relays are released suitable action will be taken to pick off the final setting of the various multiple relay groups. This may be done by connecting a group of four relays to the leads W—Z these relays operating contacts to light lamps or operate printing mechanism to show the digits concerned.

Figure 4:
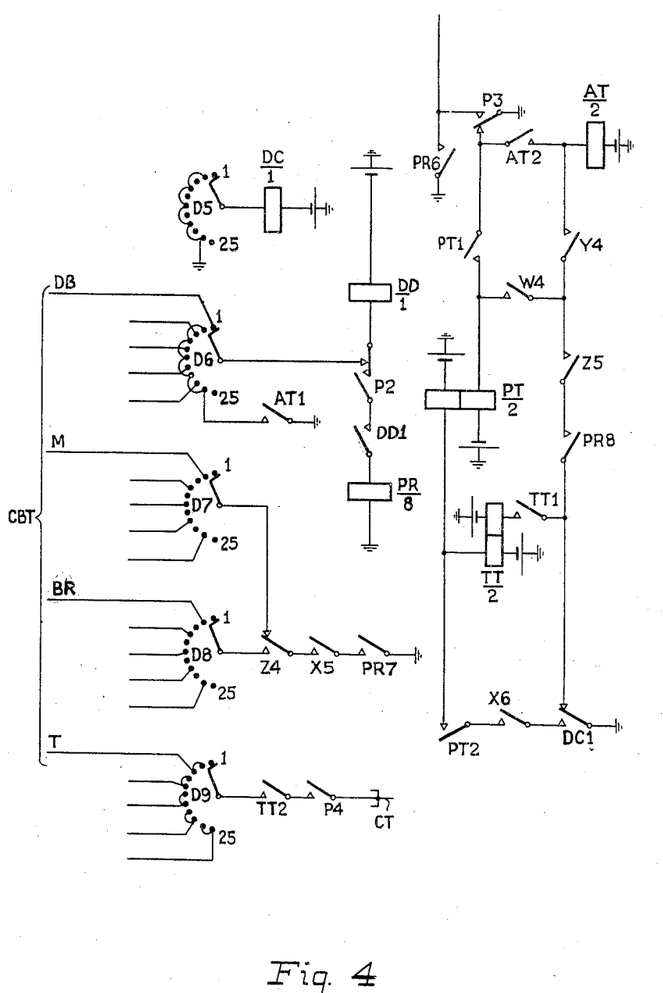
Fig. 4 when associated with Figs. 1 and 2 in the manner indicated in Fig. 9 represents timing equipment suitable for effecting multi-metering at the end of each three-minute period with breakdown at the end of nine minutes.

Considering now the arrangement represented by Figs. 1, 2 and 4 assembled as shown in Fig. 9, this caters for only two digits so that the group of bracketed leads marked 3MR in Fig. 2 will not be required in this case and each circuit will only occupy two positions of the switch so that 12 may be accommodated. The arrangement is intended to control re-metering at the end of each three-minute period and breakdown at the end of nine minutes, while in addition a warning signal is given to the subscribers shortly before the end of each three-minute period. The general method of operation is the same as previously described though in this case relay AT connects earth to alternate contacts in the bank of wiper D6 since each circuit occupies only two positions.

When the tenths of minutes multiple relay group registers 7, relays MW and MZ will be operated. Hence, when the switch wipers next reach the appropriate position this setting is transferred to relays W and Z, Fig. 2, and on the operation of relay PR a circuit is completed from earth over contacts DC1, PR8, Z5 and W4 for relay PT, Fig. 4. Relay PT at contacts PT1 prepares a locking circuit for itself which is effective when relay P releases, while at contacts PT2 a circuit is prepared for relay TT. Accordingly, when the switch steps to the next position, relay PT is held operated and relay DC is operated over wiper D5. On the first occasion relay PT is released when relay P energises but subsequently when the minutes registration is 2, 5 or 8, relay X will be operated from the associated multiple relay group and a circuit is accordingly completed for relay TT over contacts DC1, X6 and PT2, together with a maintaining circuit for relay PT by way of its left-hand winding. Relay TT at contacts TT1 prepares a locking circuit for itself and at contacts TT2 prepares to connect up continuous tone from lead CT to wiper D9. The tone circuit is completed when relay P next operates and tone is extended over lead T to the circuit in question. On the de-energisation of relays P and PR the switch steps to the next position and relay DC is released but relay TT remains held up and when relay P again operates, a further tone pulse is transmitted so that the subscriber receives two pips of tone to warn him that re-metering will take place in 12 seconds time, that is to say after two further revolutions of the switch. It will be seen that when relay X is operated in position 2 of the switch it indicates the registration of 2, 5 or 8 units. Moreover if relay PR is operated it follows that relay AT is operated and this can only happen when the tenths of minutes registration is 9. Hence after the lapse of 3 or 6 minutes, relays X and PR are operated together and a circuit is then completed over contacts PR7, X5 and Z4 and lead M to initiate re-metering. At the end of nine minutes the conditions recur but now relay Z is energised as well as relay X and accordingly the metering control earth is transferred over contacts Z4 to lead BR and then produces breakdown. It will of course be appreciated that following usual practice the initial metering operation is assumed to be effected by equipment associated with the individual circuit and that the equipment of Fig. 4 only takes care of re-metering.

Figure 5:
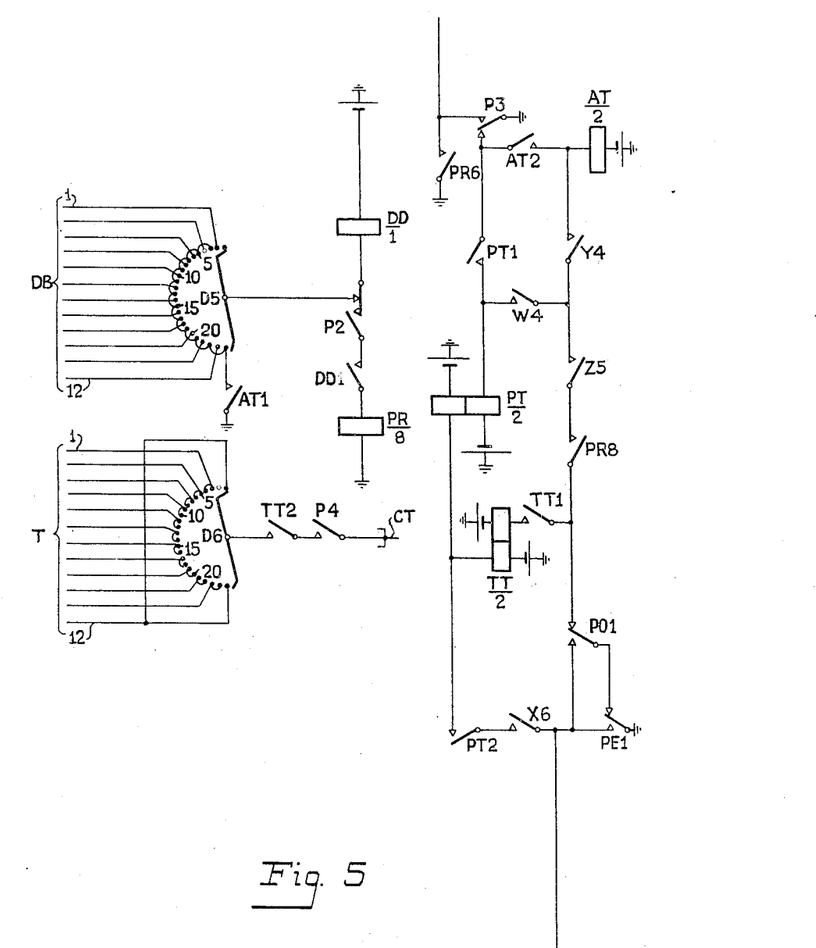
Figs. 5 and 6 which should be associated with Figs. 1 and 2 in the manner shown in Figs. 10 form a modification whereby multi-metering may be effected directly from the common timing equipment with the elimination of much of the meter control equipment usually provided at the individual battery feed point.
Figure 6:
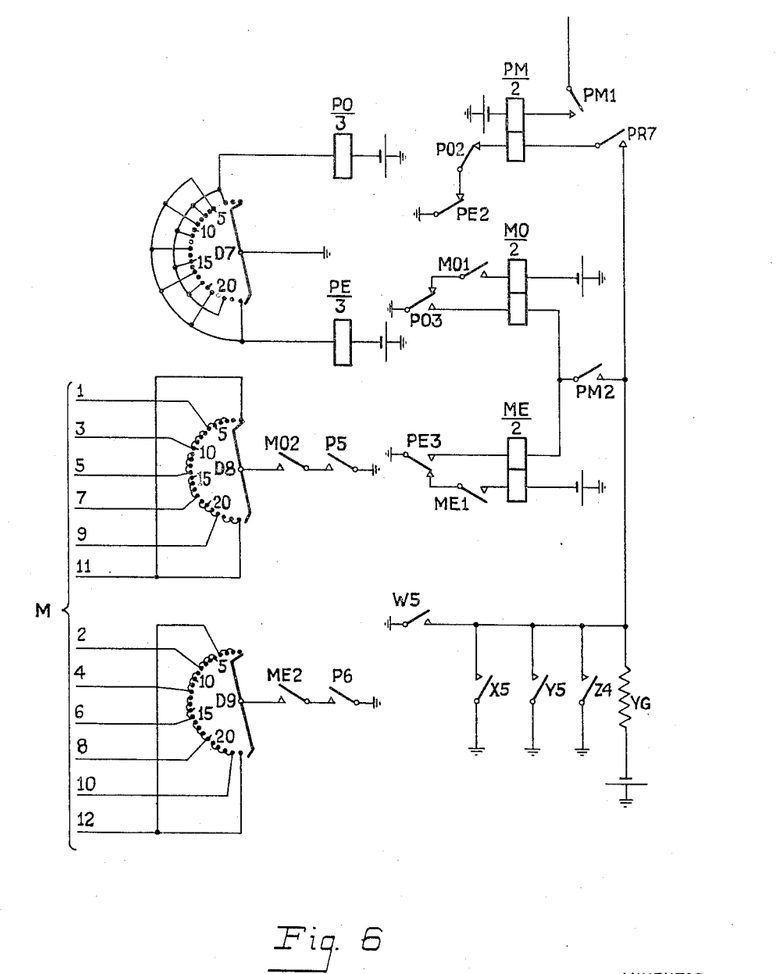

The arrangement including the equipment of Figs. 5 and 6 in place of that of Fig. 4 as indicated in Fig. 10 is generally similar, but in this case arrangements are made to transmit the appropriate number of metering pulses over the wipers of the uniselector from the common equipment on each re-metering operation. Though each circuit only requires two positions in the switch bank for its multiple relay groups, so that twelve circuits could be handled by one uniselector, it is convenient according to existing practice to cater for as many as four metering impulses. This requirement may still be met however by providing two banks, D8 and D9, Fig. 6, in place of the single bank D7, Fig. 4, and arranging for the wiring of these two banks to overlap. With the circuits shown it is assumed that metering takes place at the beginning of each three-minute period and in this instance no provision is made for breakdown so that a call may be of indefinite length. In these circumstances the minutes register never has to count beyond two so that two units of the 2nd multiple relay will give all the facilities required. Accordingly, three multiple relays can be made to serve for two circuits and thus a further economy in the amount of equipment required can be achieved. It will be seen that the relay DC of Fig. 4 is replaced in Fig. 6 by the two relays PO and PE corresponding respectively to odd and even circuits.

Considering now the operation, since the tenths of minutes register of circuit 1 is recording zero at the time when the wipers of the switch D first connect therewith, all the units of the multiple relay group are de-energised and consequently there is no potential to operate any of the relays W, X, Y and Z of Fig. 2. Hence when relay PR of Fig. 5 operates due to the fact that the circuit is in a receptive condition as evidenced by earth on lead DB, contacts W5, X5, Y5 and Z4 of Fig. 6 are all open and hence relay PM is enabled to operate by way of its lower winding from battery through resistor YG, contacts PR7, PO2 and PE2 to earth. Relay PM thereupon at contacts PM1 prepares a locking circuit for itself by way of its upper winding and at contacts PM2 prepares a circuit for relays MO and ME. When the switch advances to position 3 on the release of relay PR, relay PO is operated over wiper D7 and at contacts PO1 completes the locking circuit for relay PM, at contacts PO2 opens the initial energising circuit for this relay and at contacts PO3 completes a circuit for relay MO. If the two units of the minutes multiple relay group are now both de-energised as in the initial state and again after the lapse of three minutes, there is no shunt for relay MO and it operates and at contacts MO1 prepares a locking circuit for itself by way of its upper winding and at contacts MO2 prepares a circuit for transmitting a metering pulse over wiper D8 which circuit is completed on the operation of relay P. When relay P releases, this pulse is terminated and the switch steps to position 4 whereupon relay PO releases and brings down relay PM and permits relay MO to lock up over its upper winding. On the next operation of relay P, earth is again connected over the M lead of circuit No. 1 to transmit a further metering pulse. This action may if necessary be repeated in positions 5 and 6 and relay MO is then released by the re-operation of relay PO. In the meantime, however, relay PE will have been energised in position 5 and if the conditions relating to circuit No. 2 are suitable, relays PM and ME will be operated and consequently in the overlap positions for circuits 1 and 2, namely contacts 5 and 6, metering pulses may be transmitted to both circuits. The required number of metering pulses for each circuit is obtained by strapping the appropriate number of contacts in the group of four which are all shown wired. It will be appreciated that relay PM can only be energised and thus permit the energisation of relay MO or ME at exact minutes and furthermore these latter relays can only be energised when the registration is a multiple of 3. The operation of relays PT and TT produces the necessary warning tone in exactly the same way as in the arrangement of Fig. 4. It may be pointed out that the showing of the bank wiring of the switch D is not quite consistent in Figs. 2 and 5 and 6. In Fig. 2 the bank is shown conventionally and contacts 1 are wired while in Figs. 5 and 6 the full 25 contacts are shown and position 1 is the dead position. The principle of operation however will be quite clear to those skilled in the art.

Figure 7:
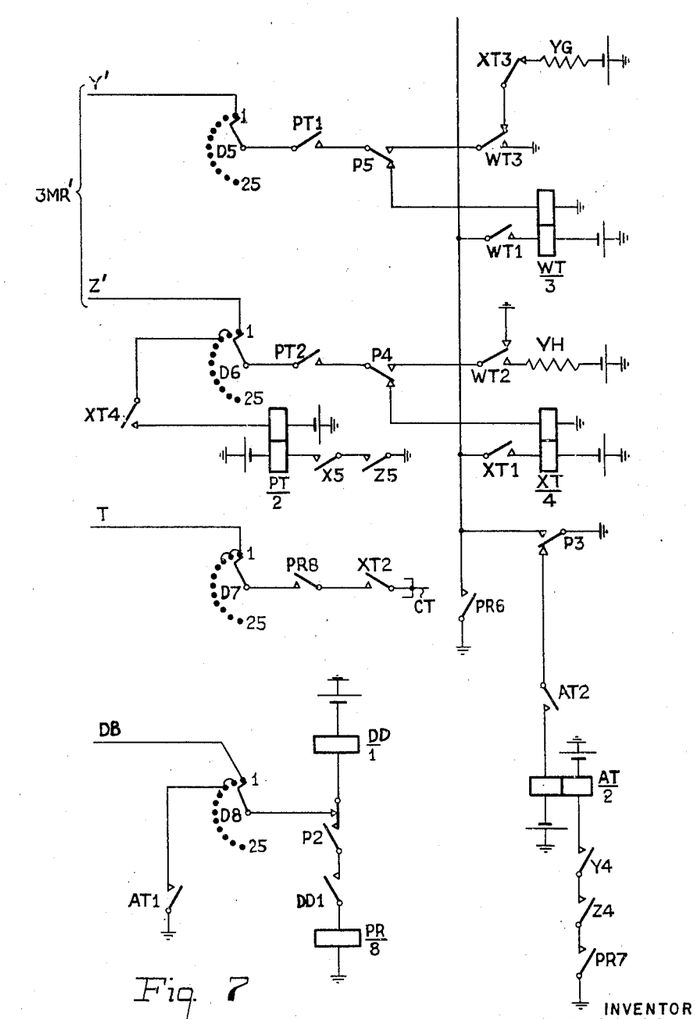
Fig. 7 when associated with Figs. 1 and 2 in the manner shown in Fig. 11 indicates a further modification suitable for counting longer periods without repeat metering and particularly designed to work in conjunction with automatic ticketing equipment for long distance calls.

Considering now the arrangement represented by Figs. 1, 2 and 7 when fitted together in the manner indicated in Fig. 11, as previously mentioned this shows an arrangement suitable for counting long intervals of time with no breakdown or metering but with the transmission of a warning tone at the end of each three-minute period. The equipment as shown is arranged to count up to a maximum of 30 minutes in which case only two relays of the multiple group are required in the tens of minutes position and the remaining two may be used for conveniently controlling the giving of the warning tone. It is also necessary to provide two additional relays WT and XT, Fig. 7, in the common equipment.

The operation will now be considered and it will be appreciated that since the equipment of Figs. 1 and 2 has already been described, attention will be concentrated on Fig. 7. On the first occasion when the tenths of minutes multiple relay group registers 8, relays MX and MZ are operated and on the next revolution of the switch, relays X and Z, Fig. 2, are energised when the wipers reach the appropriate position and hence relay PT, Fig. 7, is operated by way of its lower winding over contacts X5 and Z5. This relay thereupon connects up wipers D5 and D6 of the switch to relays WT and XT whereby connection is extended to the sphere Y and Z units of the tens of minutes multiple relay group which are at present unoperated. When relay P operates, however, the Y unit is energised over wiper D5 from battery by way of resistor YG and contacts XT3, WT3, P5 and PT1 to register one unit. Relay PT de-energises when the wipers step on and is not again operated until the next occasion when the tenths of minutes registration is 8. In these circumstances the fact that the Y unit is operated causes the operation of relay WT with the result that the Y unit is then de-energised by earth over contacts WT3, P5 and PT1 and the Z unit is operated over resistor YH, contacts WT2, P4 and PT2 so as to correspond to a registration of 2. On the third occasion on which the tenths of minutes registration is 8, that is when the total time is 2.8 minutes, relay PT is again operated and since the Z unit is energised relay XT is operated. Relay XT thereupon at contacts XT1 prepares a locking circuit by way of its lower wnding, at contacts XT2 prepares a circuit from the continuous tone lead CT over wiper D7 to the tone lead T extending to the circuit in question, at contacts XT3 prevents the operation of the Y unit and at contacts XT4 prepares a locking circuit for its upper winding in series with the upper winding of relay PT. A pulse of tone is accodingly transmitted when relay PR operates and on the release of this relay the wipers advance and relays PT and XT are locked up in series. A further tone pulse is therefore transmitted when relay PR again operates and conditions are the same in the following position of the switch. Hence a total of three pulses of tone are transmitted to the calling party by the intermittent operation of contacts PR8 approximately 12 seconds before the period is due to expire. The general timing operation is effected due to the action of the relays shown in Fig. 2 and it will be understood that arrangements will be made such that when the connection is terminated the setting of the various relays can be transferred to suitable recording equipment which will subsequently be used as the basis for the necessary accounting.

Figure 12:
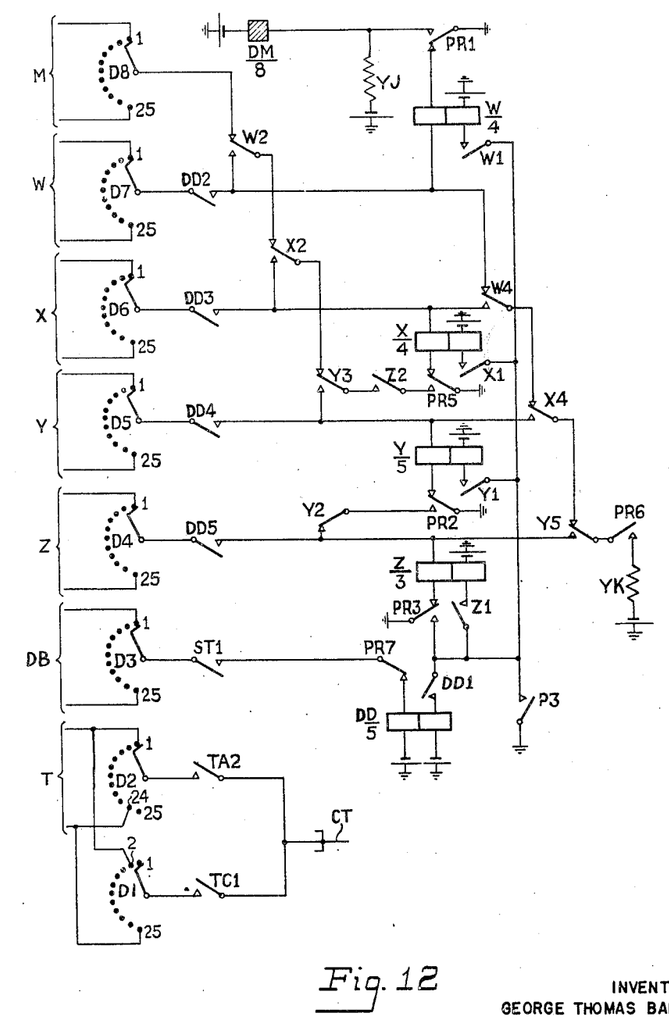
Figs. 12 and 13 show the full circuits of a slightly modified scheme working on the same general principles for providing repeat metering at the end of each three-minute period.
Figure 13:
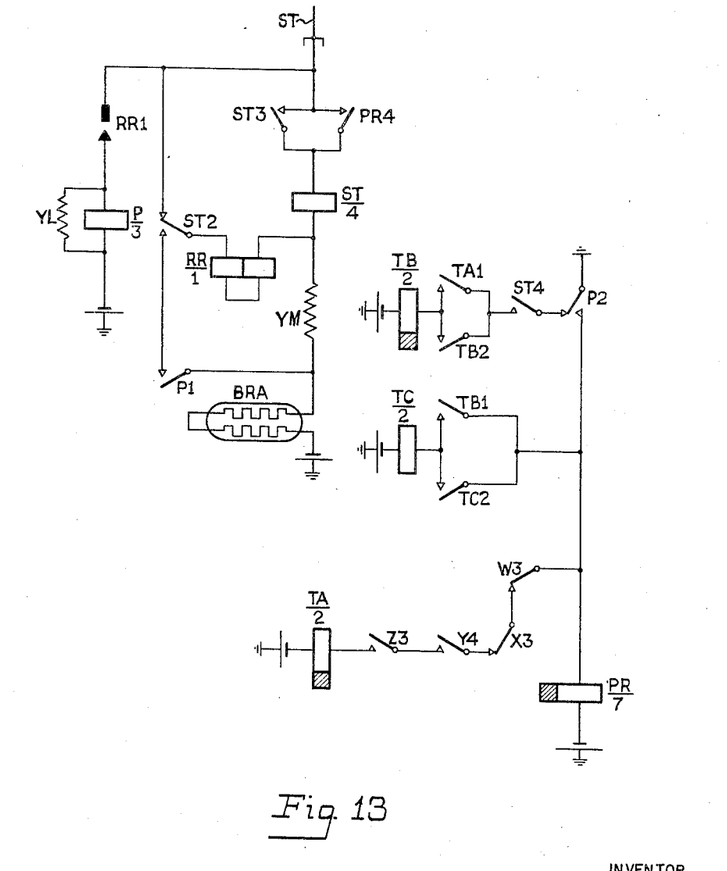

It has already been suggested that in practice the use of the arrangement shown in Fig. 2 involving straightforward interaction between the switch driving magnet and an interrupter relay is not sufficiently accurate to give satisfactory timing over long periods and a more refined method of drive is therefore required. One possibility is to allow the switch to step automatically slightly faster than the required speed and then to cause it to wait in its home position until it receives a pulse from a clock which can be arranged to be delivered accurately every six seconds. As an alternative, particularly for use in small exchanges where the provision of an accurate clock cannot be justified economically, use may be made of an oscillating magnet device of the type disclosed in British specification No. 518,877 which can be adjusted to transmit 25 impulses in six seconds with sufficient accuracy for all practical purposes. The use of this method of drive is illustrated in Figs. 12 and 13 which show an arrangement operating on the same general principles as those already described. In this case, however, the code set out in Fig. 2, which involves a maximum of two units operated is not employed but instead a code involving simultaneous operation of any number up to the full four units. This gives a total of 15 possibilities and consequently if successive rotations take place at intervals of 12 seconds, the fifteen possibilities may be arranged to cover a period of three minutes which is the unit normally employed for timing telephone conversations. This arrangement has the advantage that only a single position in the switch bank need be used for each circuit concerned so that an ordinary 25-point switch may be arranged to serve for 25 circuits. The desirability of giving the calling party two pips of tone immediately prior to the start of a new period is again catered for by using two separate banks with a slipped multiple.

Considering now the details of the operation, when the equipment is required for use, earth is connected to the common lead ST, Fig. 13, and a circuit is thereby completed over contacts ST2, both windings of the oscillating magnet relay RR, resistor YM and barretter BRA to battery. It will be understood that the barretter is employed in order to obviate any variation of the timing due to changes in battery voltage. The relay RR is energised in this circuit and swings its moving system in the direction to close its contacts RR1, thereby energising relay P from the start earth. Thereupon at contacts P1 an alternative circuit is prepared for relay RR, at contacts P2 relay PR is energised and at contacts P3 a locking circuit is prepared for relays W, X, Y, Z and DD in Fig. 12. Relay PR at contacts PR1 completes a circuit for the magnet DM of the switch, at contacts PR2 prepares for the application of earth to wiper D4, at contacts PR3 reinforces the locking earth provided by contacts P3, at contacts PR4 completes a circuit for relay ST, at contacts PR5 prepares for the connection of earth to wipers D5—D8, at contacts PR6 prepares for the connection of battery by way of resistor YK to wipers D4—D7 and at contacts PR7 opens a point in the circuit of relay DD. Relay ST is now energised in parallel with relay RR and at contacts ST1, Fig. 12, prepares a circuit for relay DD, at contacts ST2 reverses the current flow through relay RR, at contacts ST3 completes a locking circuit for itself and at contacts ST4 prepares a circuit for relay TB. The moving system of relay RR now swings in the opposite direction under the tension of the controlling spiral spring and opens contacts RR1 so that relay P releases. Thereupon the reverse circuit for the relay RR is again opened and the moving system therefore swings in the opposite direction sufficiently far to close contacts RR1 again whereupon relay P energises and at contacts P1 again completes the circuit of the magnet RR to drive the system in the opposite direction. This operation is arranged to continue at a controlled speed as long as earth is maintained on lead ST which is as long as any of the 25 circuits concerned require a timing operation. It will be understood that the inclusion of the winding of relay ST in series with relay RR and also the shunt formed by the resistor YM limit the reverse energisation of relay RR so as to keep the system oscillating satisfactorily. The magnet DM is also made slightly slow by the presence of the shunt formed by resistor YJ. The release of relay P opens the circuit of relay PR which releases also after a slight interval and opens the circuit of the magnet DM so that the wipers are advanced one step. It will be assumed that they then occupy the position shown in Fig. 12 and that the first circuit requires a timing operation so that earth is connected to lead DB. This earth is then extended over wiper D3 and contacts ST1 and PR7 to operate relay DD. This relay at contacts DD1 prepares a locking circuit for itself, which becomes operative when relay P next energises, and at contacts DD2, DD3, DD4 and DD5 connects up wipers D7, D6, D5 and D4. It is assumed that the multiple relay group connected to the bracketed leads W, X, Y and Z in position 1 is registering zero so that all the multiple group relays are de-energised. When relay P is next energised it again operates relay PR and battery is then extended by way of resistor YB over contacts PR6, Y5, X4, W4 and DD2 to operate the W unit of the multiple relay group. This unit locks up in the usual manner and therefore connects battery to the lead extending to the bank of wiper D7 in order to produce a suitable effect on the next revolution of the switch. No further operations are produced at this time and when relays P and PR again release, the wipers are stepped to the next set of contacts and relay DD releases unless the circuit then encountered requires a timing operation.

The switch now steps on and deals with the other circuits as may be required in accordance with the positions which the associated multiple relay groups then occupy and when it again reaches position 1, relay DD is operated and thereupon the battery provided by the operated W unit is extended through the left-hand winding of relay W to earth over contacts PR1. Relay W therefore energises and at contacts W1 prepares a locking circuit for itself to earth at contacts P3 and PR3, at contacts W2 prepares a shunting circuit for the W unit, at contacts W3, Fig. 13, opens a point in the circuit of relay TA, and at contacts W4 prepares a circuit for operating the X unit. When relay PR operates, relay W is held up over its right-hand winding and battery by way of resistor YK is connected to wiper D6 to operate the X unit.

After a further revolution of the switch the fact that the MW and MX relays in the multiple relay group are operated will cause the operation of relays W and X in the common equipment, and hence on the operation of relay PR, battery is connected by way of resistor YK and contacts PR6, Y5 and X4 to wiper D5 to operate the Y unit.

Similarly, on the next revolution since the MW, MX and MY relays are now operated, relays W, X and Y in the common equipment operate and battery is then extended over contacts PR6, Y5 and DD5 to wiper D4 to operate the MZ relay while contacts Y2 prevent this connection being shunted out by earth over contacts PR2.

On the next or fifth revolution of the switch, relays W, X, Y and Z are operated with the result that on the operation of relay PR earth is applied to wiper D5 over contacts PR5, Z2 and Y3 to de-energize the Y unit leaving relays MW, MX and MZ operated.

On the following revolution relays M, X and Z are operated, with the result that earth is extended over contacts PR2 and Y2 to release the Z unit while battery is extended over contacts PR6, Y5 and X4 to re-operate the Y unit and hence relays MW and MY are operated.

On the next revolution relays W and Y are operated so that battery over contacts PR6 and Y5 operates the Z unit and the combination operated is relays MW, MY and MZ.

On the next revolution, therefore, relays W, Y and Z will be operated with the result that earth over contacts PR5, Z2 and Y3 will release the Y unit leaving relays MW and MZ operated.

On the next revolution, therefore, which is the ninth, only relays W and Z are operated and accordingly earth is extended over contacts PR5, Z2, Y3, X2 and W2 to release the W unit. Earth is also extended over contacts PR2 and Y2 to release the Z unit and battery is extended over contacts PR6, Y5, X4 and W4 to re-operate the X unit which is therefore the only one operated.

It will readily be seen on tracing through the circuits that the subsequent combinations left operated after the tenth to fifteenth revolutions are in turn XY, XYZ, XZ, Y, YZ and Z.

At the end of the 14th revolution when relays Y and Z are operated, a circuit is completed on the energisation of relay P from earth over contacts P2, W3, X3, Y4 and Z3 for relay TA, Fig. 13. This relay thereupon at contacts TA1 prepares a circuit for relay TB and at contacts TA2 connects continuous tone from lead CT to wiper D2 and hence to the T lead extending to the circuit in question. On the de-energisation of relay P the circuit for relay TA is opened but it holds up for a short interval owing to its slug and relay TB is then operated over normal contacts P2. Relay TB thereupon at contacts TB1 prepares a circuit for relay TC and at contacts TB2 completes a locking circuit for itself. When relay P next energises after the wipers have advanced to the succeeding position, relay TC operates and at contacts TC1 again connects up tone though now by way of wiper D1 and at contacts TC2 completes a locking circuit for itself. It will be appreciated that the second tone pulse which is terminated when relay P releases is connected to the same T lead owing to the slip of one contact in the multipling between the banks of wipers D1 and D2. Accordingly, 12 seconds before each three-minute period is due to expire the calling party is given two pips of tone separated by an interval of roughly half a second and will then know that a further metering operation is about to take place.

If he hangs up before this is effected, earth will be removed from the DB lead so that relay DD will fail to operate on the subsequent revolution and the relays of the common equipment do not therefore come into operation as regards this circuit. If the subscriber maintains the connection, however, when the appropriate position is again reached the energisation of the Z unit in the multiple relay group causes the energisation of relay Z in the common equipment. Accordingly, when relay PR operates, earth is extended over contacts PR5, Z2, Y3, X2 and W2 to wiper D8 whence it is applied to the appropriate M lead to initiate a further metering operation. Earth is also applied as previously described over contacts PR2 and Y2 to wiper D4 to release the operated Z unit and battery is applied over contacts PR5, Y5, X4, W4 and DD2 to wiper D7 to operate the W unit. Accordingly the equipment has now been taken through a full cycle and if the connection is maintained the counting of a further three-minute period proceeds as just described. It may be mentioned that it will generally be more convenient for the multiple relays to be mounted adjacent to the common equipment rather than adjacent to the circuits with which they are associated and this is particularly desirable when the units of a multiple relay group are split between two circuits as was suggested for the circuit of Figs. 5 and 6.

According to the invention therefore considerable economy may be secured in timing equipment suitable for use in telephone systems since only one, two or at most three multiple relay groups are required for each individual circuit and the common equipment is very compact and of simple character.

I claim:

1. In an electric timing arrangement, a rotating timing switch operating at a predetermined speed, a contact bank for said switch, a plurality of devices to be timed, means to successively seize and operate each of said devices through said bank during each rotation to register thereon the time during which such device has been timed, and means individual to said switch and controlled through said bank by each said device as it is seized to determine the elapsed time registered on such device.

2. In an electric timing apparatus, a plurality of devices conditioned for timing, a constantly rotating contact switch common to said devices and arranged to make each rotation in a fixed time period, wipers on said switch, means for seizing and setting each of said devices through said wipers during each rotation of said switch to register on each said device the total time during which such device has been timed, a register common to said devices, and means for momentarily setting said register through said wipers by each such device upon seizure thereof to indicate the total time then registered by such device.

3. In an electric timing device, a constantly operating rotary switch, contacts and brushes for said switch, a first timing register connected to said contacts, a second timing register connected to said brushes, means for conditioning said first register for timing, means for then operating and setting said first register from said second register at each revolution of said switch to indicate the time elapsed since such conditioning, and means for setting said second register from said first register at each such revolution following such conditioning to indicate the prior setting of said first register.

4. In an electric timing device as in claim 3 said second means controlled by the said settings of said second register for resetting said first register to its next setting.

5. A timing device as in claim 3, in which the operating parts of the registers consist only of electromagnetic relays.

6. In an electrical timing arrangement for separately timing the use periods of a plurality of devices, an individual register for each said device, a constantly rotating switch common to said registers, contact banks for said switch, said registers individually connected to said banks, means for successively operating and setting said individual registers through said banks at each revolution of said switch following the taking into use of the corresponding device to indicate on such registers the elapsed time during which the corresponding device has been in use, a common register associated with said switch, and means for operating and setting said common register from each such operated individual register on the next revolution of said switch to indicate momentarily on said common register the previous setting of such operated individual register.

7. In a timing arrangement as in claim 6, other contact banks for said switch, and means responsive to certain of said momentary settings of said common register for passing pulses of potential through said other banks to the device associated with the individual register corresponding to the instant position of said switch.

8. In a timing arrangement as in claim 6, means responsive to the taking out of use of any of said devices for restoring the corresponding individual register immediately to its normal position and disabling it against further operation during the ensuing period of non-use of such device.

9. In an electrical timing device, a plurality of time registers individually conditioned for registering at irregular intervals, a continuously operated rotary timing switch making a complete revolution in a fixed time and having successive access to each of said registers once during each such revolution, means for operating each of said conditioned registers once during each revolution of said switch in a fixed cycle of operations for cumulatively registering thereon the time such register has been currently conditioned for timing, another register, means for transfering each such registration to said other register at each subsequent revolution of said switch, and means for repeating the cycle of operations of each said conditioned register indefinitely as long as such register remains conditioned for timing.

10. In a timing circuit, a constantly rotating switch arranged to rotate in a given period of time, contact banks and brushes for said switch, a first group of relays in a first register associated with said contact banks, a second group of relays in a second register associated with said brushes, means for conditioning said first group of relays for timing, means responsive to such conditioning for then operating and setting said first group of relays in different combinations during subsequent rotations of said switch to indicate the number of such rotations since said conditioning, means for transferring each such setting of said first group over said contact banks and brushes to said second group on the next rotation of said switch, and means responsive to each such setting of said second group for immediately resetting said first group to its next setting over the same brushes and contact banks.

11. In a timing circuit as in claim 10, a first and a second sub-group of relays in said first register, means for setting said first sub-group in different combinations from said second register over said brushes during each rotation, means for repeating said settings in recurrent cycles of operation each representing the same number of rotations, means for operating said second sub-group from said second register over said same brushes at the end of each such cycle to indicate the number of cycles completed since said first register was conditioned for timing, and means for transferring the combined settings of both said sub-groups to said second register over said same brushes at each rotation of said switch to currently indicate the total number of revolutions and the time elapsed since conditioning.

12. In a timing circuit as in claim 10, a device to be timed associated with said first register, means for setting said first and second sub-groups during successive positions of said switch, and means responsive to certain resultant settings of said second register for passing a pulse of potential to said associated device in each such position of said switch.

GEORGE THOMAS BAKER.

REFERENCES CITED

The following references are of record in the file of this patent:

UNITED STATES PATENTS

| Number | Name | Date |
|---|---|---|
| 1,953,474 | Fowler | Apr. 3, 1934 |
| 2,112,375 | Mead | Mar. 29, 1938 |
| 2,232,181 | McClew et al. | Feb. 18, 1941 |
| 2,241,896 | Wochinger | May 13, 1941 |
| 2,291,496 | Newstedt | July 28, 1942 |